June 9, 1942.    M. J. KAHAN    2,285,930
EXTRACTION APPARATUS
Filed April 21, 1939

INVENTOR.
Mortimer J. Kahan
BY James Harrison Bowen
ATTORNEY.

Patented June 9, 1942

2,285,930

UNITED STATES PATENT OFFICE 2,285,930

EXTRACTION APPARATUS

Mortimer J. Kahan, New York, N. Y., assignor, by direct and mesne assignments, to Earl Meyer, New York, N. Y.

Application April 21, 1939, Serial No. 269,090

1 Claim. (Cl. 23—272)

The purpose of this invention is to provide an improved method and device for extracting a coffee or other concentrate in which extraction is obtained without heat and at atmospheric temperature.

The invention is in the use of a container having granulated coffee or other material occupying a major portion thereof, with a compressed air chamber at the lower end and an area to be filled with water at the upper end and positioned above the material so that the weight of the water is on the material; wherein the water penetrates quickly downward through the material forcing the air downward from within and around the particles of material. A vent tube releases any excess air in the air chamber. This air, which has been driven downward through the mass of material, enters the air chamber and is driven up and escapes through the vent tube. The tube acts as a vent tube until the water passing downward through the material reaches the bottom of the tube and begins to rise therein, forming a water seal which shuts off the vent and seals the proper amount of air in the air chamber so as not to allow the liquid which passes through the mass to enter the air chamber.

The water, which penetrates quickly downward through the material because of the vent through the air chamber, moves through and across a perforated plate, separating the material from the compressed air chamber, and then upward through a vent tube in the center of the material. When the water reaches the base of the tube, the coffee mass is completely saturated.

The top plate, which is positioned upon the material and which has perforations therein, may be adjusted to different levels, and is adjusted to a certain level depending upon the quantity of material placed in the apparatus, and, when in place, a screw clamp or ring with thumb screws is moved into position above the perforated plate and secured in place. This holds the material in place and prevents the material from rising and mixing when liquid is placed thereon.

Many attempts have been made to obtain a coffee concentrate, however most attempts use heat and boil the coffee, and boiled coffee does not keep, and, therefore, it has been found desirable to develop a process of forming a coffee concentrate in which the entire process is accomplished at atmospheric temperature and without heat.

The object of this invention is, therefore, to provide an improved method of making a coffee or other concentrate without the use of heat.

Another object is to provide an apparatus for producing a coffee or other concentrate in which the air is forced out of the granular particles, by the weight of the water superimposed thereon, downward to the air chamber and the excess air escapes upward and out through the vent tube.

Another object is to provide an apparatus for obtaining a coffee or other concentrate in which the bitter oils and other by-products remain in the material and are not combined in the concentrate.

A further object is to provide an apparatus for obtaining a concentrate from granulated material, in which extraction is obtained through the material by a water chamber at the upper end and a vertical tube through the material and communicating with the air chamber which acts, first, as a vent tube, second, as a water seal which seals the air chamber, and, third, as a flow vent when the apparatus is being drained.

And a still further object is to provide an apparatus for obtaining concentrates of coffee and other materials by a process which is of a simple and economical construction.

With these ends in view the invention embodies an apparatus comprising a container with a draw-off cock at the lower end, and an air chamber communicating with the cock, and a removable cover having vents therein, a perforated plate covered by a strainer at the lower end and having a spout extending upward through the center of the container which acts as an air vent, a seal, and a flow vent, in the order named, and another perforated disc having holding means thereon adapted to be positioned on top of material in the container.

Other features and advantages of the invention will appear from the following description taken in connection with the drawing, wherein.

Figure 1:
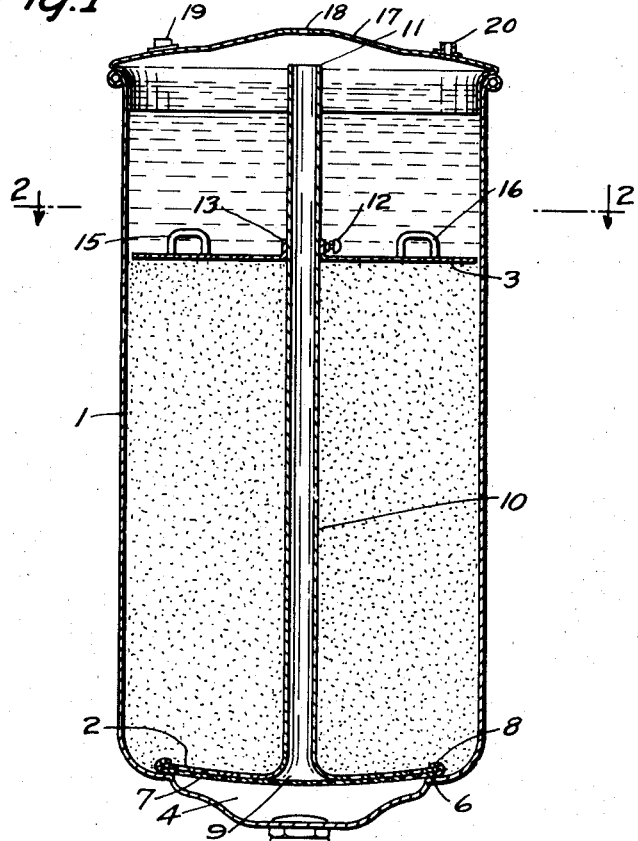
Figure 1 is a view showing a cross section through the apparatus.

In the drawing the device is shown as it may be made, wherein numeral 1 indicates the container of the apparatus, numeral 2, the lower perforated plate, and numeral 3, the upper perforated plate.

The container 1 is illustrated as being of a cylindrical shape, however it will be understood that it may be of any shape and may be of any length or size.

This container is formed with an air chamber 4 at the lower end having a drain or draw-off cock 5 therein, and the plate 2 rests upon a continuous shoulder 6 at the intersection of the air chamber 4 and the body of the container. The plate 2 is covered with a strainer 7 of cloth or any suitable material, and this is positioned on the under side of the plate with the edges rolled over and bound on the upper side of the plate, as indicated at the point 8. The central part of the plate 2 curves upward, as illustrated at the point 9, and opens into a tube 10 that extends upward to a point 11 which is slightly above the upper end of the container 1, and, therefore, above the level of a fluid that may be placed in the container.

Figure 2:
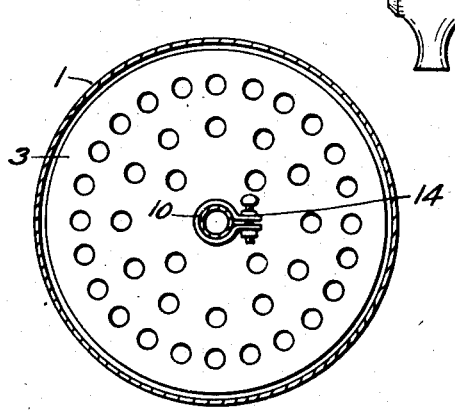
Figure 2 is a sectional plan through the upper portion of the apparatus on line 2—2 of Figure 1, showing the upper perforated disc and showing an alternate method of securing the disc to the tube.
Figure 3:
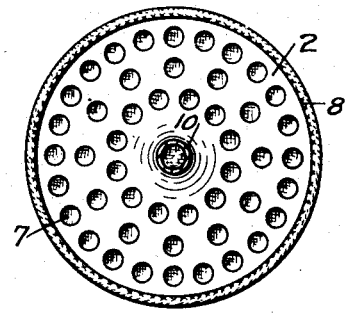
Figure 3 is a detail showing the lower perforated plate.

The disc 3 is mounted upon the tube 10, and, after the apparatus is filled with ground coffee or other material, the disc is moved downward against the upper surface of the material and clamped in place by a thumb screw 12 in a ring 13, in the design shown in Figure 1, however, it may also be held by a clamp 14, as illustrated in Figure 2, or any suitable means may be used for securing the disc 3 to the tube 10, to prevent its being forced upward by the pressure caused by the expansion of material confined in the container and held between the plate and disc. The disc may also be provided with handles 15 and 16 by which it may be removed and replaced. The upper end of the apparatus is provided with a cover 17 having a vent 18 in the top of the center, and it may also be provided with additional vents 19 and 20 at the sides, although it will be understood that only one or any number of vents may be used.

It will be understood that changes may be made in the construction of the apparatus without departing from the spirit of the invention. One of which changes may be in the shape, design, or size of the air compartment at the lower end, another may be in the type or design of the cover, and still another may be in the use of screens or perforated plates above and below the material of any other type or design.

The construction of the apparatus will be readily understood from the foregoing description.

In use the apparatus will be filled with ground or pulverized coffee or other material with the plate 2 in place, and the coffee or other material will occupy a substantial area of the container, providing a relatively large area for water at the upper end, and then the disc 3 is placed on the material and forced downward and secured in place. Water is then supplied to the upper end of the container, and the weight of the water resting upon the material will force the water downward, and this will force air out of the small spaces around the particles and also out of the particles, and then air will be crowded downward, with the air first escaping through the vent tube 10 until water passing downward reaches the lower end of the mass of material passing all of the way through the material and through the perforations in the plate 2, and the water will then pass along the under surface of the plate to the tube 10, and then upward through the tube, seeking the level of the water in the container. The water does not pass through the strainer 7 but clings to the under surface of the plate and moves toward the tube where it passes upward, and when the tube is filled with water it stops the air, causing the air to be compressed in the chamber in the lower end.

When the apparatus is ready to be drained after the material has been extracting in the process for a certain length of time, the drain cock at the bottom of the air chamber is opened, and the vent tube reverses its action, and the water in the tube, which has become a concentrate during the process of extraction, drains rapidly downward and out of the drain cock ahead of the liquid within the coffee mass.

Having thus fully described the invention, what I claim as new, and desire to secure by Letters Patent, is:

An extraction apparatus comprising a vertical cylindrical container having a circular depression in the bottom thereof surrounded by an annular shelf, a perforated plate resting on said shelf and having a tube secured thereto centrally thereof said tube terminating at the level of the plate, a fibrous material underneath said plate, a cover plate adapted to be adjustably held in place on said tube, and a cover for the container, said perforated plate and fibrous material together with said circular depression forming a closed chamber at the bottom of the container.

MORTIMER J. KAHAN.